United States Patent Office

Re. 27,592
Reissued Mar. 6, 1973

27,592

NOVEL PROCESS FOR THE PREPARATION OF TRANS-CHRYSANTHEMUMIC ACID

Jacques Martel, Bondy, Chanh Huynh, Le Raincy, Edmond Toromanoff, Paris, and Gerard Nominé, Noisy-le-Sec, France, assignors to Roussel-UCLAF, Paris, France No Drawing. Original No. 3,445,499, dated May 20, 1969, Ser. No. 454,691, May 10, 1965. Application for reissue Mar. 22, 1971, Ser. No. 127,019
Claims priority, application France, May 26, 1964, 975,870, 975,871
Int. Cl. C07c *147/06, 148/08, 51/09*
U.S. Cl. 260—464 11 Claims

Matter enclosed in heavy brackets [ ] appears in the original patent but forms no part of this reissue specification; matter printed in italics indicates the additions made by reissue.

ABSTRACT OF THE DISCLOSURE

A novel process for selectively producing d,l-trans chrysanthemumic acid which has the same configuration as the naturally occurring said acid which is useful as an intermediate for pyrethreum esters widely used as insecticides and to novel intermediates formed therein.

PRIOR ART

Trans-chrysanthemumic acid is known to be the acid portion of natural esters of the pyrethrin and cinerin type and the synthetic esters of the allethrin type, and these different types of esters are known to have high degree of insecticidal activity and a very slight toxicity to humans and warm-blooded animals.

Trans-chrysanthemumic acid may be obtained by hydrolysis of natural pyrethrines and by various synthetic methods, none of which is satisfactory for commercial production. Direct synthesis methods have consisted of reacting 2,5-dimethyl-hexa-2,4-diene with a diazoacetic acid ester or diazoacetonitrile and hydrolyzing the resulting product. However, these direct methods give a mixture of cis- and trans-chrysanthemumic acid and are not suitable for commercial use due to the danger in manipulating the not very stable diazo compounds (see Progress in the Chemistry of Organic Natural Products, vol. 19, 1961, p. 133).

Recently, different but indirect methods have been described. Two of these consist of preparing pyrocine, the lactone compound, in several steps by starting either from isobutylidene acetone and a bromoacetic acid ester or from levulinic acid and methyl allylic alcohol, then opening the lactone ring and effecting cyclization to trans-chrysanthemumic acid esters (French Patent No. 1,269,-127 and C. R. Acad. Sci., vol. 256 [1963], p. 436). A third indirect method starts with the Kharasch reaction by condensing β-alkoxy-isovaleraldehyde with ethyl isopropylidene cyanoacetate and converting the resulting product in five steps to trans-chrysanthemumic acid (Bull. Soc. Chim., 1963, p. 448). All these processes, however, have the disadvantages of being lengthy or using starting materials which are difficult to obtain.

OBJECTS OF THE INVENTION

It is an object of the invention to provide a simple, direct, economical process for the selective preparation of trans-chrysanthemumic acid.

It is another object of the invention to provide a novel process for the preparation of trans-chrysanthemumic acid from safe starting materials which are easily prepared.

It is a further object of the invention to provide novel intermediates for the preparation of trans-chrysanthemumic acid.

These and other objects and advantages of the invention will become obvious from the following detailed description.

THE INVENTION

The process of the invention for the preparation of trans-chrysanthemumic acid comprises reducing an aryl sulfonyl halide of the formula $$Ar—SO_2—X$$

wherein Ar is an aryl group having 1 to 4 aromatic rings and may have substituents selected from the group consisting of lower alkyl, lower alkoxy, halo lower alkyl, halogen and nitro and X is a halogen such as chlorine to the corresponding aryl sulfinic acid, forming an alkali metal salt of the aryl sulfinic acid, reacting the latter with a 3-methyl-2-butenyl halide such as the chloride or bromide to form the corresponding aryl (3-methyl-2-butenyl) sulfone, reacting the latter in a basic medium with a compound selected from the group consisting of the nitrile of senecioic acid (β-methyl crotonic acid) and lower alkyl esters of senecioic acid to form the corresponding 3,3,6-trimethyl-4-(aryl sulfonyl)-5-hepten-1-oic acid derivative, cyclizing the latter in a basic medium to form the corresponding ester or nitrile derivative of trans-chrysanthemumic acid and hydrolyzing the latter to trans-chrysanthemumic acid. The reaction scheme is illustrated in Table I.

A modification of the process to facilitate the purification when the lower alkyl ester of senecioic acid is used comprises saponifying the lower alkyl ester of 3,3,6-trimethyl-4-(aryl sulfonyl)-5-hepten-1-oic acid to the free acid, isolating and purifying the free acid and then esterifying the acid for the cyclization step.

One of the characteristics of the process of the invention which distinguishes it from prior art processes is that the sulfone function performs two successive roles due to its capability of attracting electrons. In the third step of the process, the sulfone group activates the α-methylene group which permits its 1,4-addition to the conjugated double bond compound and this addition is remarkable since it occurs in spite of the unfavorable steric and electronic hindrances of the gem-dimethyl group. In the fourth step of the process, the sulfone group aids the intermolecular cyclization in the basic medium by being eliminated in the form of the sulfinic anion, $Ar—SO_2—$, since under these conditions the cyclization yields stereoselectively the trans-form of chrysanthemumic acid. It is to be understood that the foregoing theoretical considerations are not intended to limit the invention in any fashion.

TABLE I

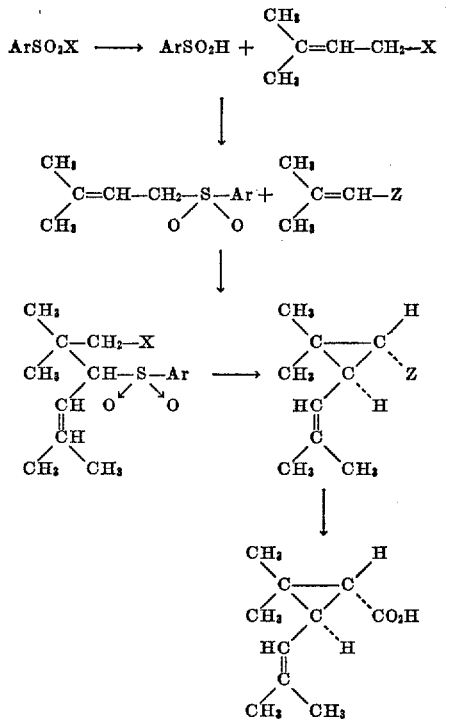

wherein X is a halogen, Z is selected from the group consisting of —CN and —COOR, R is a lower alkyl radical of 1 to 7 carbon atoms and Ar is an aryl radical.

Examples of suitable starting aryl sulfonyl halides are unsubstituted compounds having 1 to 4 aromatic rings such as benzene sulfonyl chloride, naphthalene sulfonyl chloride lower alkyl aryl sulfonyl halides such as toluene sulfonyl chloride, etc.; lower alkoxy aryl sulfonyl halides such as methoxy benzene sufonyl halide, etc.; halo lower alkyl aryl sulfonyl halides such as chloromethylbenzene sulfonyl chloride; halo aryl sulfonyl halides such as chlorobenzene sulfonyl chloride; and nitro aryl sulfonyl halides such as p-nitrobenzene sulfonyl halide, etc.

The aryl sulfonyl halides can be reduced to aryl sulfinic acids with reducing agents such as zinc, sodium sulfite, sodium sulfide, stannous chloride or organic metallic compounds or lithium aluminum hydride (see, for example, Truce, Chem. Rev., vol. 48 [1951], p. 69). Zinc is the preferred reducing agent since the zinc salt of the aryl sulfinic acid is formed and can be reacted with an alkali metal carbonate such as sodium carbonate to form the alkali metal salt of the aryl sulfinic acid.

The reaction of the alkali metal salt of aryl sulfinic acid with the haloalkene is a classic method of forming sulfones. A preferred method is reacting the aryl sulfinic acid with sodium methylate in methanol to form the salt and adding the halo alkene thereto.

The lower alkyl esters of senecioic acid can be obtained by oxidation of mesityl oxide to senecioic acid followed by conventional esterification with a lower alkanol such as methanol, ethanol, tert.-butanol, etc. Senecionitrile can be prepared from the cyanohydrin of isobutyraldehyde or by condensation of acetone and cyano acetic acid.

The reaction of the aryl (3-methyl-2-butenyl) sulfone with the senecioic acid derivative is performed in the presence of a basic agent such as an alkali metal alcoholate, i.e., sodium or potassium t-butanolate, under anhydrous conditions in the presence of an organic solvent such as an aromatic hydrocarbon, ethers, di-lower alkyl amides of lower alkanoic acids, di-lower alkyl sulfoxides, etc. A preferred mode is reacting equimolar amounts of the reactants at temperatures of about 0° in the presence of at least one molar equivalent of potassium t-butanolate in tetrahydrofuran.

The duration of the said reaction and the amounts of the basic agent may have some influence on the reaction. For example, when reacting phenyl (3-methyl-2-butenyl) sulfone with ethyl senecioate in the presence of two molar equivalents of potassium t-butanolate for 20 to 40 hours, ethyl trans-chrysanthemumate could be directly isolated. The addition and cyclization reactions occur successively without isolation or purification of the intermediate compound, the alkyl ester of 3,3,6-trimethyl-4-(aryl sulfonyl)-5-hepten-1-oic acid.

The said intermediates may be isolated and purified if desired by reducing the reaction times and using a smaller excess of the basic agent. For purification purposes, the ester is preferably saponified to the free acid which is purified and re esterified, i.e., with diazomethane.

The cyclization is effected under anhydrous conditions in the presence of a basic agent such as an alkali metal alcoholate, i.e., sodium tert. amylate, potassium tert.-butanolate, alkali metal amides and hydrides such as sodium amide, sodium hydride, etc. The solvent may be an aromatic hydrocarbon such as benzene, toluene, etc.; an ether such as tetrahydrofuran; di-lower alkylamides of lower alkanoic acids such as dimethylformamide, dimethylacetamide, etc.; or di-lower alkyl sulfoxides such as dimethylsulfoxide. A preferred mode is sodium tert.-amylate in benzene at about room temperature.

In the following examples there are described several preferred embodiments to illustrate the invention. However, it should be understood that the invention is not intended to be limited to the specific embodiments.

Example I.—Preparation of phenyl (3-methyl-2-butenyl) sulfone

Step A: Preparation of benzene sulfinic acid.—100 gm. of zinc dust were suspended in 500 cc. of ether and after 5 cc. of water were added thereto, the mixture was energetically agitated while a few cc. of benzene sulfonyl chloride were introduced. The suspension was heated to reflux to initiate the reaction and then the heating was stopped. 100 gm. of benzene sulfonyl chloride were added thereto over a period of about one-half hour in order to maintain the ether under reflux. After the introduction the benzene sulfonyl chloride was completed, the reaction mixture was again heated at reflux for about one hour, then cooled and filtered. The recovered precipitate was washed with water, then taken up in a solution of 100 gm. of sodium carbonate in 500 cc. of water, and the mixture was heated to about 85 to 90° C. for a period of 45 minutes under strong agitation. The mixture was then cooled and the insoluble matter was removed by filtration. The aqueous filtrate was concentrated to about 400 cc. and after cooling, it was acidified by the addition of dilute hydrochloric acid. The precipitate formed was vacuum filtered, washed with water, dried under vacuum at room temperature to a constant weight to obtain 73 gm. of benzene sulfinic acid.

Step B: Preparation of phenyl (3-methyl-2-butenyl) sulfone.—34 gm. of benzene sulfinic acid were introduced with agitation at room temperatures into 80 cc. of a 2.9 N solution of sodium methylate in methanol and then a few minutes later, 35 gm. of 3-methyl-2-butenyl bromide were added very slowly, and the agitation was continued for 10 minutes after the addition. Next, the methanol was removed while maintaining the initial volume constant by first adding water to the mixture and then extracting it with methylene chloride. The organic extract was washed with water, dried and the solvent was removed by distillation. The residue was crystallized from petroleum ether (boiling point of 60° to 80° C.) by cooling the ether for one-half hour. The crystallized residue was then vacuum filtered, washed with a mixture of isopropyl ether and petroleum ether (1:1) and dried under vacuum to obtain 35 gm. of phenyl (3-methyl-2-butenyl) sulfone having a melting point of 54° to 56° C.

This compound was insoluble in water but was soluble in most of the usual organic solvents.

Analysis.—$C_{11}H_{14}SO_2$; molecular weight=210.8. Calculated: C, 62.84%; H, 6.71%; S, 15.22%. Found: C, 62.9%; H, 6.7%; S, 14.9%.

This compound is not described in the literature.

Example II.—Preparation of p-tolyl (3-methyl-2-butenyl) sulfone

Using the procedure of Example I, p-toluene sulfonyl chloride was reduced with zinc to obtain p-toluene sulfinic acid. Then, 20 gm. of p-toluene sulfinic acid were reacted with 19.1 gm. of 3-methyl-2-butenyl bromide to obtain 20.5 gm. of p-tolyl (3-methyl-2-butenyl) sulfone having a melting point of 82 to 84° C.

Analysis.—$C_{12}H_{16}SO_2$; molecular weight=224.32. Calculated: C, 64.24%; H, 7.19%; S, 14.29%. Found: C, 64.4%; H, 7.2%; S, 14.0%.

This compound is not described in the literature.

Example III.—Preparation of d,l-trans-chrysanthemumic acid

Step A: Preparation of 3,36-trimethyl-4-(phenyl sulfonyl)-5-hepten-1-oic acid.—12.85 gm. of phenyl (3-methyl-2-butenyl) sulfone were added to a solution of 6.9 gm. of potassium 1-butanolate in 100 cc. of tetrahydrofuran cooled to 0° C. After agitating the mixture for a few minutes at 0° C., 8.8 cc. of ethyl senecioate, about a molar equivalent, were added and the reaction mixture was allowed to stand for 15 hours at a temperature of 0° C. Then, while cooling, some 2 N hydrochloric acid was added and the reaction mixture was extracted with ether. The combined ether extracts were washed first with an aqueous solution of sodium bicarbonate, then with water and dried. The solvent was distilled off and a residual oil was obtained. 60 cc. of methanol, 6 cc. of water and 4 cc. of sodium hydroxide were added to this residue and the mixture was heated at reflux for one and a half hours. Then, the methanol was distilled off under vacuum and the reaction mixture was diluted with water and extracted with ether. The aqueous phase was acidified with 2 N hydrochloric acid and then extracted with methylene chloride. The organic extracts were washed with water until the wash waters were neutral, dried and evaporated to dryness. The residue thus obtained was crystallized from isopropyl ether to obtain 3,3,6-trimethyl-4-(phenyl sulfonyl)-5-hepten-1-oic acid having a melting point of 108° C.

Analysis.—$C_{16}H_{22}O_4S$; molecular weight=310.4. Calculated: C, 61.90%; H, 7.14%; S, 10.33%. Found: C, 61.8%; H, 7.1%; S, 9.9%.

This compound is not described in the literature.

The 3,3,6-trimethyl-4-(phenyl sulfonyl)-5-hepten-1-oic acid was characterized by its p-bromophenacyl ester prepared in the following manner.

0.321 gm. of 3,3,6-trimethyl-4-(phenyl sulfonyl)-5-hepten-1-oic acid was neutralized with N sodium hydroxide and after a solution of 0.5 gm. of p-bromophenacyl bromide in 10 cc. of ethanol was added, the reaction mixture was heated at reflux for 3 hours. Next, the ethanol was distilled off under vacuum and the reaction mixture was diluted with water and extracted with methylene chloride. The organic phase was washed with water and the solvent was removed by distillation. A resin residue was obtained which was crystallized from a mixture of isopropyl ether and petroleum ether (boiling point=60° to 80° C.) to obtain the p-bromophenacyl ester of 3,3,6-trimethyl-4-(phenyl sulfonyl)-5-hepten-1-oic acid

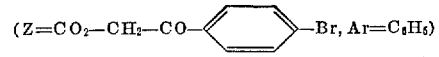

which after recrystallization from ether, had a melting point of 80° C.

This compound occurred in the form of colorless crystals insoluble in water, slightly soluble in ether and soluble in acetone, benzene and chloroform.

Analysis.—$C_{24}H_{27}O_5SBr$; molecular weight=507.45. Calcaluated; C, 56.8%; H, 5.36%; Br, 15.75%. Found: C, 56.6%; H, 5.5%; Br, 15.6%.

This compound is not described in the literature.

Step B: Preparation of the methyl ester of 3,3,6-trimethyl-4-(phenyl sulfonyl)-5-hepten-1-oic acid.—0.7 gm. of 3,3,6-trimethyl-4-(phenyl sulfonyl)-5-hepten-1-oic acid were dissolved in 10 cc. of methylene chloride the solution was cooled to 5° C. and a solution of diazomethane in methylene chloride was added thereto until a persistent yellow color appeared. The reaction mixture was allowed to stand for 10 minutes at 0° C. and then excess diazomethane was destroyed by addition of alumina. The solvent was distilled off and the residue was crystallized from petroleum ether (boiling point of 60 to 80° C.). The precipitate was vacuum filtered to obtain 0.646 gm. of methyl ester of 3,3,6-trimethyl-4-(phenyl sulfonyl)-5-hepten-1-oic acid having a melting point of 57° C.

This compound occurred in the form of colorless crystals insoluble in water and dilute aqueous acids and soluble in most of the usual organic solvents.

Analysis.—$C_{17}H_{24}O_4S$; molecular weight=324.43. Calculated: C, 62.93%; H, 7.46%; S, 9.88%. Found: C, 63.1%; H, 7.3%; S, 9.9%.

This compound is not described in the literature.

Step C: Preparation of methyl d,l-transchrysanthemumate.—0.868 gm. of the methyl ester of 3,3,6-trimethyl-4-(phenyl sulfonyl)-5-hepten-1-oic acid were introduced into 5 cc. of anhydrous benzene. Then 2.9 cc. of a solution of 1.86 N sodium t-amylate were adedd and the mixture was agitated for 16 hours at room temperature under an atmosphere of nitrogen. Next, the mixture was poured into iced 2 N hydrochloric acid and extracted with ether. The organic extract was washed first with a solution of sodium bicarbonate, then with water and dried. The solvent was removed to obtain an oil residue which was distilled under vacuum to obtain methyl d,l-transchrysanthemumate.

Step D: Preparation of d,l-trans-chrysanthemumic acid.—0.17 gm. of methyl d,l-trans-chrysanthemumate were introduced into 2 cc. of about a 2 N aqueous methanolic solution of potassium hydroxide and the mixture was heated at reflux for 2 hours. Then the mixture was concentrated, diluted with water and extracted with ether. The aqueous phase was acidified by addition of 2 N hydrochloric acid and then was extracted with methylene chloride. The organic extract was washed with water and the solvent was evaporated to obtain d,l-trans-chrysanthemumic acid having a melting point of 47° to 50° C., identical to the original sample of d,l-trans-chrysanthemumic acid.

This acid occurred in the form of colorless crystals slightly soluble in water and soluble in most of the usual organic solvent.

The d,l-trans-chrysanthemumic acid was characterized by its p-bromophenacyl ester prepared in the following manner.

0.14 gm. of d,l-trans-chrysanthemumic acid were dissolved in sodium hydroxide and the solution hydroxide and the solution obtained was slightly acidified by adding 0.1 N hydrochloric acid. Then, 0.166 gm. of p-bromophenacyl bromide dissolved in 3 cc. of ethanol were introduced into the solution, and the reaction mixture was heated at reflux for 2 hours. Next, the reaction mixture was diluted with ice water, extracted with methylene chloride and the organic extract was washed with water and dried. The solvent as removed by distillation and the residue was crystallized from petroleum ether. The crystals were filtered and washed with petroleum ether (boiling point=60° to 80° C.) to obtain the p-bromophenacyl ester of d,l-trans-chrystanthemumic acid having a melting point of 72° to 74° C.

The compound occurred in the form of colorless needles insoluble in water and dilute aqueous acids and soluble in most of the common organic solvents.

Analysis.—$C_{18}H_{21}O_3Br$; molecular weight=365.27. Calculated: C, 59.18%; H, 5.8%; Br, 21.88%. Found: C, 59.1%; H, 5.9%; Br, 21.6%.

This compound is not described in the literature.

Example IV.—Preparation of d,l-trans-chrysanthemumic acid

Step A: Preparation of 3,3,6-trimethyl-4-(p-tolyl sulfonyl)-5-hepten-1-oic acid.—3,3,6-trimethyl - 4 - (p-tolyl sulfonyl)-5-hepten-1-oic acid was prepared by the reaction of ethyl senecioate and p-tolyl (3-methyl-2-butenyl)-sulfone under conditions identical to Step A of Example III. In this manner, after crystallization from isopropyl ether, 3,3,6-trimethyl-4-(p-tolyl sulfonyl) - 5-hepten-1-oic acid was recovered in the form of colorless crystals having a melting point of 130° C.

Analysis.—$C_{17}H_{24}O_4S$; molecular weight=324.43. Calculated: C, 62.93%; H, 7.46%; S, 9.88%. Found: C, 63.2%; H, 7.6%; S, 9.7%.

This compound is not described in the literature.

Step B: Preparation of the methyl ester of 3,3,6-trimethyl-4-(p-tolyl sulfonyl) 5-hepten-1-oic acid.—Using the procedure of Step B of Example III, the methyl ester of 3,3,6-trimethyl-4-(p-tolyl sulfonyl)-5-hepten-1-oic acid was prepared which after crystallization from petroleum ether occurred in the form of colorless crystals having a melting point of 45° to 47° C.

Analysis.—$C_{18}H_{26}O_4S$; molecular weight=338.45. Calculated: C, 63.88%; H, 7.34%; S, 9.47%. Found: C, 63.7%; H, 7.9%; S, 9.2%.

This compound is not described in the literature.

Step C: Preparation of methyl d,l-trans-chrysanthemumate.—Using the procedure of Step C of Example III, the methyl ester of 3,3,6-trimethyl-4-(p-tolyl sulfonyl)-5-hepten-1-oic acid was cyclized to methyl d,l-trans-chrysanthemumate.

Step D: Preparation of d,l - trans - chrysanthemumic acid.—Using the procedure of Step D of Example III, methyl d,l-trans-chrysanthemumate was hydrolyzed to d,l-trans-chrysanthemumic acid which when isolated was identical to the product obtained in Example III.

Example V.—Preparation of d,l-trans-chrysanthemumic acid

Step A: Preparation of ethyl d,l - trans - chrysanthemumate.—First 4.3 gm. of phenyl (3-methyl-2-butenyl) sulfone, then 3 cc. (i.e. about an equimolar amount) of ethyl senecioate were added to a solution of 4.6 gm. of potassium t-butanolate in 40 cc. of tetrahydrofuran cooled to 0° C. The reaction mixture was allowed to stand at 0° C. for 40 hours and then while cooling 2 N hydrochloric acid was added to the mixture. The mixture was extracted with ether and the ether extract was washed with an aqueous solution of sodium bicarbonate and then with water and dried. The solvent was distilled off under vacuum and the residual oil was distilled under vacuum to obtain ethyl d,l-trans-chrysanthemumate having a boiling point of 62° to 65° C./0.7 mm.

Step B: Preparation of d,l - trans-chrysanthemumic acid.—0.348 gm. of ethyl d,l-trans-chrysanthemumate were introduced into 1.3 cc. of 2 N sodium hydroxide, 5 cc. of methanol and 0.5 cc. of water and the mixture heated under reflux for 2 hours. Next, the mixture was concentrated, diluted with water and extracted with ether. The aqueous phase was acidified with 2 N hydrochloric acid and extracted with methylene chloride. The organic extract was washed with water and the solvent was evaporated to obtain crystalline d,l - trans-chrysanthemumic acid having a melting point of 50° C. which was identical to an original sample obtained by another method.

Various modifications of the process of the invention may be made without departing from the spirit or scope thereof and it is to be understood that the invention is to be limited only as defined in the appended claims.

We claim:

1. A process for the preparation of a derivative of 3,3,6-trimethyl-4-(aryl sulfonyl)-5-hepten-1-oic acid selected from the group consisting of its lower alkyl esters and its nitrile which comprises reacting *under anhydrous conditions* in a basic medium an aryl-(3-methyl-2-butenyl)-sulfone in which the aryl has 1 to 4 aromatic rings and may have substituents selected from the group consisting of lower alkyl, lower alkoxy, halo lower alkyl, halogen and nitro with a compound selected from the group consisting of lower alkyl esters of senecioic acid and senecionitrile to form the corresponding derivative of 3,3,6-trimethyl-4-(aryl sulfonyl)-5-hepten-1-oic acid.

2. A process for the production of a compound selected from the group consisting of lower alkyl esters and the nitrile of trans-chrysanthemumic acid which comprises cyclizing under *anhydrous* basic conditions a compound selected from the group consisting of lower alkyl esters and the nitrile of 3,3,6-trimethyl-4-(aryl sulfonyl)-5-hepten-1-oic acid in which the aryl has 1 to 4 aromatic rings and may have substituents selected from the group consisting of lower alkyl, lower alkoxy, halo lower alkyl, halogen and nitro to form the corresponding derivative of trans-chrysanthemumic acid.

3. A process for the production of a compound selected from the group consisting of lower alkyl esters and the nitrile of trans-chrysanthemumic acid which comprises reacting *under anhydrous conditions* an aryl (3-methyl-2-butenyl)-sulfone in which the aryl has 1 to 4 aromatic rings and may have substituents selected from the group consisting of lower alkyl, lower alkoxy, halo lower alkyl, halogen and nitro with a compound selected from the group consisting of lower alkyl esters of senecioic acid and senecionitrile in the presence of [at least 2 molar equivalents of] a basic agent to form a compound selected from the group consisting of lower alkyl esters and nitrile of trans-chrysanthemumic acid.

4. The process of claim 1 wherein the senecioic acid compound is a lower alkyl ester of senecioic acid.

5. The process of claim 2 wherein the cyclization is effected in the presence of an excess of potassium tert.-butanolate.

6. The process of claim 2 wherein the cyclization is effected with sodium tert.-amylate.

7. A compound of the formula

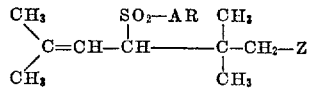

wherein Z is —COOR, R is selected from hydrogen and a lower alkyl radical of 1 to 7 carbon atoms and Ar is selected from the group consisting of lower alkylphenyl and phenyl.

8. The methyl ester of 3,3,6-trimethyl-4-(phenyl sulfonyl)-5-hepten-1-oic acid.

9. The methyl ester of 3,3,6-trimethyl-4-(p-tolyl sulfonyl)-5-hepten-1-oic acid.

10. 3,3,6-trimethyl-4-(phenylsulfonyl) - 5 - hepten-1-oic acid.

11. 3,3,6-trimethyl-4-(p-tolyl sulfonyl) - 5 - hepten-1-oic acid.

References Cited

The following references, cited by the Examiner, are of record in the patented file of this patent or the original patent.

UNITED STATES PATENTS

| | | | |
|---|---|---|---|
| 2,435,552 | 2/1948 | Bruson | 260—465 |
| 2,815,362 | 12/1957 | Harper | 260—464 |
| 3,077,496 | 2/1963 | Julia | 260—468 H X |

(Other references on following page)

FOREIGN PATENTS 1,269,127 7/1961 France.

OTHER REFERENCES

Bateman et al.: Journal Chem. Soc., 1958, p. 2889.

Shriner et al.: Systematic Identification of Org. Compds., 4th edition, John Wiley & Sons, N.Y. (1962).

Houben-Weyl: Methoden der Organischen Chemie, 4th edition, vol. 9, pp. 281–283.

Bull. Soc. Chim., 1963, p. 448.

C. R. Acad. Sci., vol. 256, p. 436 (1963).

Progress in Chemistry of Org. Natural Prod., vol. 19, p. 113 (1961).

JOSEPH P. BRUST, Primary Examiner

U.S. Cl. X.R.

260—465 K, 465 G, 465 F, 465.9, 468 H, 470, 486, 513.7, 514 P, 515 N, 520, 521, 526, 607